United States Patent [19]

André et al.

[11] 3,992,324
[45] Nov. 16, 1976

[54] PROCESS FOR THE PREPARATION OF CATALYSTS FOR THE HYDROTREATMENT OF PETROLEUM FRACTIONS

[75] Inventors: Jacques Maurice Jules Ghislain André; Raymond Marc Cahen, both of Brussels; Henri Robert Debus, Meise; Rene Odon Lammers, Brussels; Hugo Johannes Van Thillo, Grimbergen, all of Belgium

[73] Assignee: Labofina S. A., Brussels, Belgium

[22] Filed: Feb. 10, 1975

[21] Appl. No.: 548,199

[30] Foreign Application Priority Data

Feb. 18, 1974 Luxemburg............................ 69.410

[52] U.S. Cl.................................. 252/439; 252/448; 252/455 R; 252/465
[51] Int. Cl.².................... B01J 27/04; B01J 21/04; B01J 21/08; B01J 23/84
[58] Field of Search......... 252/439, 448, 465, 455 R

[56]                    References Cited
               UNITED STATES PATENTS

| 2,867,581 | 1/1959  | Nahin ............................ 252/465 X |
| 2,875,159 | 2/1959  | Erickson ............................ 252/448 |
| 3,705,861 | 12/1972 | Oguchi et al. ...................... 252/448 |
| 3,776,987 | 12/1973 | Grimes et al. .................. 252/448 X |

*Primary Examiner*—W. J. Shine

[57] ABSTRACT

A process for producing catalysts to hydrotreat petroleum fractions containing, after thermal treatment, an oxide or a sulphide of a Group VIII metal and an oxide or a sulphide of a Group VI B metal and a support consisting essentially of alumina, said process comprising preparing said catalyst in the form of beads by agglomeration of alumina by polymerizing in a hot and substantially water-immiscible fluid, an aqueous mixture which consists essentially of alumina hydrogel, alumina hydrosol and a water-soluble monomer whose uncrossed-linked polymer is water-soluble or forms a gel and then by dispersing said mixture as droplets, in a polymerization zone.

11 Claims, No Drawings

PROCESS FOR THE PREPARATION OF CATALYSTS FOR THE HYDROTREATMENT OF PETROLEUM FRACTIONS

BACKGROUND OF THE INVENTION

The present invention relates to a process for preparing catalysts which are useful for hydrotreating petroleum fractions. More particularly, the present invention relates to catalysts and their method of preparation, such catalysts useful for hydrotreating petroleum fractions, and to the hydrotreatment process carried out in the presence of these catalysts.

When crude oils are distilled, the different fractions obtained contain amounts of impurities such as sulphur, nitrogen, vanadium, nickel, etc., which vary in amount with the origin of the crude. In order for further use, these fractions generally must be improved. This improvement generally is performed by a hydrogenating catalytic treatment or hydrotreatment. The additional advantage of this hydrogenating treatment is in the conversion of heavy fractions into light fractions. The catalysts which are generally used in such process consists of an oxide of a Group VIII metal, particularly cobalt or nickel, an oxide of a Group VI B metal, particularly molybdenum or tungsten and a carrier which is usually alumina. For the industrial use of such hydrotreatment processes, catalyst life should be as long as possible for economic reasons. Moreover, it is necessary that the catalyst have a high mechanical strength and a high activity.

Several processes for preparing hydrotreating catalysts are known, and their object is to obtain catalysts having a high specific surface or pores of determined sizes. However, comparative experiments with commercial catalysts generally have shown that the activity of known hydrotreating catalysts does not mainly depend on these physical properties. These experiments have shown that a prominent part is taken by the crushing strength and the abrasion strength for the catalyst life.

It has been found that catalysts in the form of beads are more resistant to deterioration than extruded catalysts. Generally, these catalysts are prepared from alumina beads by impregnating the beads with the catalytic agents. Several processes have been proposed for preparing spheroidal alumina beads. One of these consists of dispersing an alumina hydrosol as droplets, into a medium wherein gelling occurs, and thereafter, subjecting the beads which are obtained in the form of alumina hydrogel, to one or more aging treatments in order to obtain beads having a suitable mechanical resistance. According to another known process, an alumina hydrosol is mixed with an ammonium salt and a synthetic polymer or a natural gum. The mixture is then dispersed into a water-immiscible medium and thereafter subjected to an aging treatment. However, these processes have the disadvantage of requiring long treatment times, which render them uneconomic. Further, alumina beads prepared by some of these known processes contain high amounts, even excessive on occasion, of impurities which are undesirable when these beads are used as supports for hydrotreating catalysts.

An object of the present invention is to provide a new and improved method for preparing spheroidal catalyst particles on an alumina support.

Another object of the present invention is a new and improved method of preparing particles whose catalytic activity is not inhibited by impurities.

A further object of the present invention is to provide a new and improved process for preparing particles having uniform sizes.

Still another object of the present invention is to provide a process for producing hydrotreating catalysts.

A remaining object of the present invention is to provide a process for producing hydrotreating catalysts in the form of beads having a smooth surface and a high mechanical strength and a remarkable activity.

SUMMARY OF THE INVENTION

The present invention comprises a process for producing catalysts useful in the hydrotreatment of petroleum fractions, said catalysts containing, after thermal treatment such as drying and calcining, at least an oxide or a sulphide of a Group VIII metal and at least an oxide or a sulphide of a Group VI B metal and an alumina support, said process comprising preparing said catalysts in the form of beads which are agglomerated with alumina, by polymerizing in a hot and substantially water-immiscible fluid, an aqueous mixture which comprises an alumina hydrogel, alumina hydrosol and a water-soluble monomer whose uncrossed-linked polymer is water-soluble or forms a gel, this mixture being dispersed as droplets into a polymerization zone. Beads are thereby formed. The beads are then treated with solutions of compounds which generate oxides or sulphides of the Group VIII or Group VI B metals, and thereafter subjected to a thermal treatment.

More particularly, the process of the present invention comprises (a) producing an aqueous mixture which consists essentially of alumina hydrogel, alumina hydrosol and a water-soluble monomer whose uncrossed-linked polymer is water-soluble or forms a gel, dispersing said mixture as droplets into a hot and substantially water-immiscible fluid, (b) polymerizing said monomer contained in each droplet of said aqueous mixture, (c) recovering beads consisting essentially of alumina hydrogel and hydrosol, agglomerated by the polymer, (d) treating said beads with a solution of a compound capable of generating an oxide or a sulphide of a Group VIII metal and with a solution of a compound capable of generating an oxide or a sulphide of a Group VI B metal, and (e) subjecting the resulting beads to a thermal treatment.

A preferred embodiment of the invention comprises preparing an aqueous mixture consisting essentially of from 5 to 30% by weight (based on metallic oxide) of alumina hydrogel and hydrosol, 0.25 to 20% by weight of a water-soluble ethylenically unsaturated monomer whose uncrossed-linked polymer is water-soluble or forms a gel, and 0.05 to 2% by weight of a polymerization catalyst, dispersing said aqueous mixture, as droplets, into a water-immiscible fluid, having a temperature of 50° to 105° C, at atmospheric pressure, maintaining said droplets in said fluid until beads are formed and become hard, recovering said beads, impregnating said beads with a solution of a compound capable of generating an oxide or a sulphide of a Group VIII metal and with a solution of a compound generating an oxide or a sulphide of a Group VI B metal, and subjecting the beads to a thermal treatment.

According to another embodiment of the present invention, the process of the present invention for preparing catalysts comprises, (a) producing an aqueous mixture consisting essentially of alumina hydrogel and hydrosol, a compound capable of generating an oxide or a sulphide of a Group VIII and Group VI B metals and a water-soluble monomer whose uncrossed-linked polymer is water-soluble or forms a gel, dispersing said mixture as droplets into a hot and substantially water-immiscible fluid, (b) polymerizing said monomer contained in each of said droplets of said aqueous mixture, (c) recovering beads consisting essentially of alumina hydrogel and hydrosol and of a compound capable of generating said oxide or sulphide, agglomerated by the polymer, (d) subjecting said beads to a thermal treatment.

A preferred embodiment of this latter embodiment of the process of the present invention comprises preparing an aqueous mixture consisting essentially of from 5 to 29.95% by weight (based on aluminium oxide) of alumina hydrogel and hydrosol, 0.05 to 10% by weight of a compound capable of generating an oxide or a sulphide of a Group VIII and Group VI B metal (based on oxide or sulphide), the total amount of hydrogel, hydrosol and said generating compounds not exceeding 30% by weight, 0.25 to 20% by weight of a water-soluble monomer, ethylenically unsaturated, whose uncrossed-linked polymer is water-soluble or forms a gel, and 0.05 to 2% by weight of a polymerization catalyst, dispersing said aqueous mixture, as droplets, into a water-immiscible fluid having a temperature of 50° to 105° C, at atmospheric pressure, maintaining said droplets in said fluid until beads are formed and become hard and drying or drying and calcining said beads.

DESCRIPTION OF THE PREFERRED EMBODIMENTS

Impregnation of the beads with the solution of a compound capable of generating a metallic oxide or sulphide as hereinabove discussed, may be carried out on the undried beads, the dried beads or on the calcined beads. Impregnation of calcined beads has the advantage of allowing the preparation of catalyst containing precise amounts of catalytic agent. When several successive impregnations are performed, the beads are preferably subjected to a thermal treatment (drying or calcining) between each impregnation.

The alumina hydrogel and the compounds which generate metallic oxides or sulphides, added to the starting aqueous mixture, generally are introduced in finely divided form in order to ensure ready dispersion into the starting aqueous mixture. The alumina hydrogel may be prepared by any known method and particularly, be treating aluminium sulphate with a base, by hydrolyzing an aluminium alcoholate such as aluminium isopropylate or by treating an alkali aluminate with an acid or with aluminium sulphate. The precipitate so obtained is waterwashed and dried. The exact composition of alumina hydrosols is not known. These hydrosols may be prepared from aluminium bromide, aluminium sulphate, aluminium alcoholates and preferably from aluminium chloride, or by digesting metallic aluminium into hydrochloric acid or into hydrated aluminium chloride. In this latter case, it may be considered that the acid compounds have the formula x Al(OH)$_3$ - AlCl$_3$ wherein x is between 4 and 6. The terms "alumina hydrogel" and "alumina hydrosol," as used herein, include not only these compounds in a pure state, but also these compounds containing a minor amount of silica or alkali silicate or similar material. In other words, the starting aqueous mixture may contain sodium silicate in an amount (Based on SiO$_2$) which may reach 20% of the alumina hydrogel and hydrosol weight (based on Al$_2$O$_3$).

The compound capable of generating an oxide or a sulphide of a Group VIII or Group VI B metal may be the oxide or sulphide or a compound which gives the oxide or sulphide by thermal or chemical treatment. In other words, an ammonium molybdate may be used as a generating compound for molybdenum oxide and cobalt nitrate as a generating compound for cobalt oxide. Other generating compounds include nickel nitrate or chloride, cobalt acetate or chloride, ammonium chromate, chromium oxalate and the like. According to a preferred embodiment of the present invention, at least one of these catalytic agent generating compounds is introduced into the starting aqueous mixture in an amount which does not generally exceed 10% of the mixture by weight.

The starting aqueous mixture must remain sufficiently free flowing at room temperature to allow an easy dispersion thereof in the form of droplets into the polymerization mixture. In order to avoid excessive investment and drying costs of the beads obtained by the process, too dilute solutions of the starting aqueous mixture are to be avoided. Preferably, the aqueous mixture which is used, contains in finely divided form, 5 to 30% by weight of alumina hydrogel and hydrosol (based on Al$_2$O$_3$) and compounds capable of generating metallic oxide or sulphide (based on oxide and sulphide). In some instances, when an acid monomer is used, the aqueous mixture of alumina hydrogel and hydrosol becomes thixotropic or may be thickened with the formation of an irreversible gel. This stiffening may be avoided (which does not result from a polymerization of the monomer) by subjecting the aqueous mixture to a vigorous stirring. It also is advantageous to prepare starting aqueous mixtures which contain no more that 10 to 20% by weight of alumina hydrogel and hydrosol (based on aluminium oxide). When basic monomers are used, the alumina hydrogel and hydrosol content of the starting aqueous mixture may be higher but without exceeding about 30% by weight based on Al$_2$O$_3$.

In the starting aqueous mixture, the weight ratio of alumina hydrogel to alumina hydrosol may vary between wide limits, generally between 99 : 1 and 50 : 50, and more particularly between 85 : 15 and 55 : 45, the weights of hydrogel and hydrosol being based on Al$_2$O$_3$. A preferred embodiment for preparing the starting aqueous mixture consists in digesting hydrogel into hydrosol, this treatment being accelerated as temperature is increased. The hydrogel plus hydrosol content may vary in the starting aqueous mixture, and also the hydrogel to hydrosol ratio, to the extent the aqueous mixture remains sufficiently free flowing to be easily dispersed in finely divided droplets into the polymerization mixture. Those skilled in the art may readily determine the optimum conditions for obtaining such a fluid mixture in view of the teachings herein.

The water-soluble monomer whose uncrossed-linked polymer is water-soluble or forms a gel is selected from the group consisting of ethylenically unsaturated compounds comprising acrylic compounds of the general formula

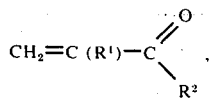

wherein $R^1$ is H or a methyl radical and $R^2$ is a $-OR^3$, or $-NR^3R^4$ radical with $R^3$ and $R^4$ in such radical being H or a hydrophilic radical, particularly a hydroxyalkyl radical containing from 1 to 2 carbon atoms or a methoxy methyl radical. Non-limiting examples of such compounds are acrylic acid, methacrylic acid, acrylamide, methacrylamide, N-hydroxy-methylacrylamide, N-hydroxymethylmethacrylamide, N-methoxymethylacrylamide, N-methoxymethylmethacrylamide, ethyleneglycol monocrylate, ethyleneglycol monomethycrylate and the like. The choice of the monomer mainly depends on economic conditions, and, for that reason, acrylic acid, methacrylic acid, acrylamide and mixtures thereof preferably are used.

The term "water-soluble monomer whose uncrossed-linked polymer is water-soluble or forms a gel," as used herein, includes ethylenically unsaturated monomer mixtures containing a major part of monomers whose uncrossed-linked polymers are water-soluble and a minor part of monomers whose uncrossed-linked polymers are water-insoluble.

The amount of water-soluble monomer employed depends on many factors, such as amounts of alumina hydrogel and hydrosol, monomer type, desired apparent density for the final calcined beads, etc. Generally, the amount of monomer is between 0.25 and 20% by weight of the aqueous mixture. It has been observed that the behavior of the beads obtained by the process of the present invention depends on the respective amounts of alumina hydrogel plus hydrosol (based on oxide). Preferably, the monomer is used in an amount corresponding to about 5 to 150% of the alumina hydrogel plus hydrosol weight (based on oxide). Higher amounts of monomers may cause a disaggregation of the beads when these latter are subjected to calcination. Too low an amount of monomer gives beads which are not readily workable and not very firm. In order to obtain beads which, after calcination, present interesting properties with regard to density and mechanical strength, an aqueous mixture is used wherein the amount of monomer corresponds to about 5 to 75% of the alumina hydogel plus hydrosol by weight (based on oxide).

the starting mixture is dispersed into a substantially water-immiscible fluid, having a temperature between about 50° and 105° C, at atmospheric pressure. Preferably, the aqueous mixture is introduced with the aid of calibrated orifices or nozzles, in order to obtain a subdivision of said mixture in the form of droplets which are dispersed into the fluid. The residence time of the droplets in the fluid must be sufficient to permit the polymerization of the monomers. This water-immiscible fluid may be a gas, such as dry air, which is introduced into a tower in counter-current flow to the droplets of the starting aqueous mixture. Another advantageous embodiment of the invention is in using, as such fluid, a water-immiscible liquid. This liquid may have a density higher than that of the beads to be prepared. In such case, the starting aqueous mixture is introduced as droplets at the bottom of a column containing the liquid and the beads formed and then recovered from the surface of the liquid. Another embodiment consists in using a liquid medium whose density is lower than that of the beads, and more particularly a mineral oil. A generally used such technique is described in U.S. Pat. No. 2,620,314. Such technique consists in using a column filled with hot oil in which droplets of an aqueous mixture are let to fall, the residence time of the droplets in the oil being sufficient to allow the polymerization of the monomer. Temperature of the liquid is at least equal to about 50° C in order to reduce the polymerization time. Temperatures higher than about 105°–110° C induce an evaporation of water and a disaggregation of beads, except if the process is carried out under pressure. According to a preferred embodiment, the temperature of the liquid is between 75° and 100° C, at atmospheric pressure.

In order to reduce the time needed for the beads to form, it is advantageous to use means for promoting the polymerization of the monomers. Free radical catalysis techniques with peroxidic compounds are particularly useful, and especially redox system catalysis, which consists of using as catalyst a combination of a peroxidic compound and a reducing agent. Persulphuric acid, hydrogen peroxide, perboric acid and their salts, particularly sodium, potassium or ammonium persulphates and the water-soluble peracids, such as peracetic acid, are examples of useful peroxidic compounds. Reducing agents may be selected from the group consisting of sodium thiosulphate, sodium hyposulphite or dithionite, sodium or potassium bisulfite, N,N,N',N'-tetramethylethylene-diamine, sodium formaldehydrosulfoxylate, hydrazine, ascorbic acid, etc. A part of the reducing agent may be introduced into the starting aqueous mixture, the other part being added into the water-immiscible fluid in which the polymerization is performed, to the extent such reducing agent is soluble to the fluid. It may also be added into the vessel in which the beads are recovered. The term "polymerization catalyst," as used herein, includes the peroxidic compound when this latter is used with or without reducing agent. The amount of polymerization catalyst can vary widely, and depends on the inhibitor content of the monomer used. Generally, the amount of polymerization catalyst employed is between about 0.05 and 2% by weight of the aqueous mixture when the monomer is substantially free from inhibitors.

The mixture subjected to polymerization may contain a cross-linking agent which has functional groups so that the polymer chains are linked together and form a three dimensional structure. Cross-linking agents may be 1,3-di(acryl- or methacryl-amidomethyl)-2-imidazolidone, hexahydrotriacryloyltriazine, N,N'-methylidene-bis-acrylamide and alkylidene-bis-acrylamides, such as N,N'-methylene-bis-acrylamide and N,N'-ethylidene-bis-acrylamide when the acrylic monomer used has an amide group, an aldehydic compound may be used as cross-linking agent, such as formaldehyde and glyoxal. Glyoxal reacts with a part of acrylamide to form N,N'-dihydroxyethylene-bis-acrylamide. It is not necessary to add a cross-linking agent when the acrylic monomers are in an acid medium, but it may be useful to reduce attrition of the beads formed. The amount of cross-linking agent does not generally exceed 1% of the weight of the aqueous mixture, although higher amounts may be used, but without any significant advantage.

The beads obtained are subjected to a thermal treatment, particularly drying at a temperature of about 110° C. When used as catalysts or catalyst supports, the beads are calcined by progressively increasing the temperature up to about 400° to 800° C, preferably 500° to 700° C. During this calcination the organic matter contained in the beads is destroyed and finally, beads consisting of firmly agglomerated alumina are obtained.

The hydrotreating catalysts prepared by the process of the invention preferably comprise about 2 to 8% by weight of an oxide or sulphide of a Group VIII metal, particularly cobalt or nickel, and about 5 to 35% by weight of an oxide or sulphide of a Group VI B metal, particularly molybdenum or tungsten. More particularly, the catalysts comprise from 2 to 5% by weight of cobalt oxide or sulphide and from 5 to 15% by weight of molybdenum oxide or sulphide or from 4 to 8% by weight of nickel oxide or sulphide and from 5 to 15% by weight of molybdenum oxide or sulphide.

The following examples are presented to illustrate the present invention but are not to be construed as limiting. Except as otherwise specifically stated, the percentages indicated in the examples are expressed by weight. In the examples, the mechanical resistance of the beads is expressed by the crushing resistance measured with the Tablet Hardness Tester apparatus (of Manestry Machines Ltd, Liverpool, Great Britain), in which the bead is placed between two plates, one of which is fixed and the other moves for increasing weight. The mechanical resistance values given in the examples are the average values of experiments performed on five beads.

For hydrodesulphurization catalysts, no precise relation exists between their physical properties and their catalytic activity. Then the relative space activity is considered. In such case, the space activity of a reference catalyst is determined; it is a commercial catalyst which contains 18.8% by weight of molybdenum oxide, 5.2% by weight of nickel oxide, less than 0.06% of cobalt oxide, 10.9% of $SiO_2$, the rest being alumina. The relative space activity of the catalyst is the number of m³ of feed to desulphurize which can be treated per m3 of catalyst per hour, to obtain a determined desulphurization of this fraction, divided per the number of m³ of feed which can be treated per m³ of the reference catalyst and per hour to obtain the same degree of desulphurization. This relative space activity (RSA) of a catalyst is given by the following formula:

$$RSA = \frac{(LHSV) x}{(LHSV) \text{ ref}} \times 100$$

where LHSV is the liquid hourly space velocity of the treated feed and ref. is the reference catalyst, and $x$ is the catalyst prepared hereunder. The desulphurization which is considered is 70% of residual sulphur for a gas oil, 10% of residual sulphur for a naphtha, and 24% of residual sulphur for a petroleum distillation residue.

EXAMPLE 1

Part A - Preparation of the catalyst

An aqueous mixture was prepared containing the following:

| | |
|---|---|
| alumina hydrogel | 8% (based on $Al_2O_3$) |
| alumina hydrosol | 2% (based on $Al_2O_3$) |
| acrylic acid | 1% |
| dihydroxyethylene-bis-acrylamide | 0.05% |
| ammonium persulphate | 0.20% |

-continued

| | |
|---|---|
| sodium bisulphite | 0.02% |

Alumina hydrogel was prepared by treating aluminium sulphate with caustic soda up to pH = 9. The precipitate obtained was waterwashed, dried at 110° C, crushed and sieved. Alumina hydrosol contained 6.8% of aluminium and 8.22% of chlorine. Alumina hydrogel, alumina hydrosol and water were mixed together. The mixture was heated at 95° C for one hour, and thereafter cooled at about 20° C before adding the other reactives. This mixture was injected dropwise into a column containing paraffinic oil ($d_{14}^4$: 0.83) heated at 100° C. Beads formed and were recovered at the bottom of the column. The beads were waterwashed, washed in an ammonium solution and then maintained in a 5.6% ammonium solution for a period of time. The beads were then dried at 110° C and calcined at 500° C. After calcination, the beads had an apparent density of 0.55 g/ml and a crushing strength of 3.65 kg. These beads were impregnated under vacuum with an ammonium paramolybdate solution at pH = 7. The beads were recovered by filtration, dried at 120° C, and thereafter impregnated under vacuum with a cobalt nitrate solution. The beads were dried at 110° C and calcined at 575° C. The catalyst beads obtained contained 3.9% of CoO and 13.9% of $MoO_3$.

Part B - Determination of catalytic activity

The catalyst prepared in Part A was subjected to a presulphurization by treating it with a gas mixture containing hydrogen (85% by volume) and $H_2S$ (15% by volume), at a flow rate of 0.5 l/hr. The temperature in the reactor was maintained at 400° C. This gas mixture was then substituted by hydrogen and a hydrodesulphurization of gas oil (distilling between 193° and 362° C) containing 1.002% of sulphur was carried out, at a temperature of 275° C and under a pressure of 35 kg/cm². Several experiments were then performed at different hourly space velocities of 3.4, 5, 8 and 12 liters of feed per hour per liter of catalyst and by using 450 m³ of hydrogen per m³ of gas oil. Under the same conditions, the gas oil was subjected to hydrodesulphurization in the presence of the reference catalyst. It was considered that the reference catalyst had a space activity of 100. The space activity of the catalyst prepared as described in Part A of this Example, was 147.

By way of comparison, space activity of three other commercial catalysts was determined. They were also constituted of oxides of Groups VIII and VI B metals and of alumina. The average relative space activity of these three catalysts was 93.

EXAMPLE 2

The procedure described in Part A of Example 1 was repeated, but with an aqueous mixture containing 0.75% by weight of acrylic acid and 0.30% by weight of acrylamide instead of 1% of acrylic acid. This catalyst was used as described in Part B of Example 1 for hydrodesulphurizing gas oil. The relative space activity of this catalyst was 142.

EXAMPLE 3

The procedure described in Example 1 was repeated, but with a starting aqueous mixture containing the following:

| | |
|---|---|
| alumina hydrogel | 8% (based on Al₂O₃) |
| alumina hydrosol | 2% (based on Al₂O₃) |
| methacrylic acid | 0.75% |
| N,N'-ethylidene-bis-acrylamide | 0.03% |
| ammonium persulphate | 0.10% |
| sodium bisulphite | 0.01% |

The beads obtained after drying and calcining had an apparent density of 0.57 g/ml and a crushing strength of 3.5 kg. 11.7 g. of these beads were impregnated under vacuum with 20.1 ml. of a solution containing 4.06 g. of ammonium heptamolybdate and 7.0 g. of cobalt nitrate. After drying at 120° C and calcining at 500° C, the beads contained 4.3% of CoO and 13.1% of MoO.

The relative activity of this catalyst under the conditions of Part B of Example 1 for gas oil was 167.

EXAMPLE 4

The procedure described in Example 1 was repeated but with a starting aqueous mixture containing the following:

| | |
|---|---|
| alumina hydrogel | 8% (based on Al₂O₃) |
| alumina hydrosol | 2% (based on Al₂O₃) |
| sodium silicate | 0.33% |
| (with 30.4% of SiO₂) | |
| acrylic acid | 1.5% |
| dihydroxyethylene-bis-acrylamide | 0.075% |
| ammonium persulphate | 0.24% |
| sodium bisulphite | 0.024% |

The beads were recovered at the bottom of a column containing oil heated at 97° C. They had been maintained in cold oil at 25° C during 20 hours. After waterwashing, they were maintained in a 5.6% ammonium solution. Thereafter, they were dried at 120° C and calcined at 700° C. The calcined beads had an apparent density of 0.768 g/ml and a crushing strength of 3.7 kg. 349 g. of these beads were dipped under vacuum into 531 ml. of a solution containing 139 g. of ammonium heptamolybdate and 60.6 ml. ammonium at 28%. Thereafter, the beads were dried at 120° C and then impregnated under vacuum with a solution containing 85.5 g. of cobalt nitrate. The impregnated beads were then dried at 120° C and calcined at 500° C. They contained 2.78% of CoO, 15.2% MoO₃ and 1.35% SiO₂. The space activity of this catalyst used for hydrodesulphurizing gas oil as in Example 1 was 185.

With this catalyst, the hydrotreatment of a petroleum distillation residue, also was performed, this residue boiling above 350° C and containing 4.1% sulphur. Several experiments were carried out at different hourly space velocities varying between 0.25 to 2 liters of feed per hour and per liter of catalyst, and by using 100 m³ of hydrogen per m³ of feed. Under the same conditions, this residue was subjected to treatment in the presence of the reference catalyst which was previously subjected to a sulphurization step. It was considered that the reference catalyst had a space activity of 100. The relative space activity of the catalyst prepared pursuant to this Example was 124. Also, in the experiment wherein the hourly space velocity was 0.25 liter of feed per liter of catalyst per hour, 26% of a fraction whose boiling point was under 350° C, was produced.

EXAMPLE 5

An aqueous mixture was prepared containing the following:

| | |
|---|---|
| alumina hydrogel | 13.2% (based on Al₂O₃) |
| alumina hydrosol | 8.8% (based on Al₂O₃) |
| acrylamide | 4.5% |
| ethyleneglycol monomethacrylate | 1% |
| glyoxal | 0.2% |
| ammonium persulphate | 0.60% |
| sodium bisulphite | 0.06% |

For preparing this mixture, hydrogel, hydrosol and water were mixed together at 95° C for one hour. Thereafter the mixture was cooled at room temperature before adding the other reactants. This mixture was injected dropwise at the bottom of a column containing Phenoclor DP 4 (chlorinated diphenyl sold by Progil S. A. and having a density of 1.39 at 100° C) having a temperature of 100° C. The beads were recovered from the surface of the liquid, were waterwashed, dried at 110° C and calcined at 550° C. These beads were impregnated under vacuum with a solution containing ammonium molybdate and nickel nitrate, and after drying at 120° C and calcining at 550° C, beads were obtained which contained 12.8% of MoO and 6.2% of NiO. The relative activity of this catalyst was 139 when it was used for hydrodesulphurizing gas oil.

EXAMPLE 6

An aqueous mixture was prepared containing the following:

| | |
|---|---|
| alumina hydrogel | 8% (based on Al₂O₃) |
| alumina hydrosol | 2% (based on Al₂O₃) |
| Molybdenum oxide | 15.5% |
| acrylic acid | 1.5% |
| dihydroxyethylene-bis-acrylamide | 0.075% |
| ammonium persulphate | 0.24% |
| sodium bisulphite | 0.024% |

Alumina hydrogel, alumina hydrosol and water were mixed together. This mixture was heated at 95° C for 1 hour. After cooling at about 20° C, the evaporated water was replaced, molybdenum oxide was added, the mixture was stirred for one hour and thereafter the other constituents of the mixture were added.

This mixture was injected dropwise into a column containing paraffinic oil heated at 95° C. The beads were recovered at the bottom of the column, were waterwashed, dried at 110° C and calcined at 500° C. The calcined beads contained 13.5% of MoO₃. They were then impregnated under vacuum with a cobalt nitrate solution. After drying at 110° C and calcining at 500° C, they contained 3.4% of CoO in addition. The relative activity of this catalyst was 115 when it was used for hydrodesulphurizing gas oil.

EXAMPLE 7

An aqueous mixture was prepared containing the following:

47.7 g. of alumina hydrogel, prepared by hydrolyzing aluminium isopropylate and drying at 110° C (25% water)

41.15 g. of alumina hydrosol (containing 10.58% of aluminium and 10.41% chlorine)

1.64 g. of sodium silicate (30.4% of SiO₂)

6.7 g. of $MoO_3$
6.21 g. of $Co(NO_3)_2 - 6 H_2O$
11.8 ml of a solution containing 63.5% of acrylic acid and 3.17% of dihydroxyethylene-bis-acrylamide.
371.7 g. of water.

First, hydrogel, hydrosol and water were mixed together. This mixture was heated at 95° C. After cooling at about 20° C, the other constituents were added. Thereafter, 10 ml of a 10% ammonium persulphate aqueous solution and 5 ml. of a 2% sodium bisulphite aqueous solution were added. This mixture was injected dropwise into a column containing paraffinic oil heated at 95° C. The beads obtained were washed with gasoline, dried at 120° C and calcined at 500° C. The beads so obtained had a crushing strength of 3.2 kg and contained 3.1% of CoO and 13.8% of $MoO_3$. The relative activity of this catalyst was 129 when it was used for hydrodesulphurizing gas oil.

EXAMPLE 8

An aqueous mixture was prepared containing the following:

| | |
|---|---|
| alumina hydrogel | 8% (based on $Al_2O_3$) |
| alumina hydrosol | 2% (based on $Al_2O_3$) |
| acrylic acid | 1.5% |
| dihydroxyethylene-bis-acrylamide | 0.075% |
| ammonium persulphate | 0.24% |
| sodium bisulphite | 0.024% |

This mixture was dispersed as droplets so as described in Example 1. 189.5 g. of the undried beads (corresponding to 20 g. of alumina) were dipped into 100 g. of an ammonium heptamolybdate solution corresponding to 5.4% of $MoO_3$. Thereafter, the beads were filtered, dried and calcined. Then they were impregnated under vacuum with a cobalt nitrate solution, dried and calcined again. The catalyst obtained in the form of beads contained 12.4% of $MoO_3$ and 3.3% of CoO. Its relative activity for hydrodesulphurizing gas oil was 112.

EXAMPLE 9

220 g. of water, 205.3 g of alumina hydrogel (corresponding to 20.8 g. of alumina) and 26 g. of alumina hydrosol (corresponding to 5.2 g. of alumina) were mixed together. This mixture was heated at 95° C during 1 hour. After cooling, the amount of evaporated water was replaced, and to this was added, under vigorous stirring, 4.1 g. of finely divided molybdenum sulphide. To this was then added, under stirring, 10 ml. of a solution containing 60% of acrylic acid and 3% of dihydroxyethylene-bis-acrylamide, 7 ml. of a 10% ammonium persulphate solution and 3.5 ml. of a 2% sodium bisulphite solution. This mixture was dispersed as droplets into a column containing oil heated at 95° C. Beads were recovered, washed, dried at 120° C and calcined at 500° C. These beads had a crushing strength of 4.5 kg. Next, these beads were impregnated with a cobalt nitrate solution and the catalyst obtained contained 6% of molybdenum and 2.6% of cobalt. The relative space activity of this catalyst for the hydrodesulphurization of gas oil was 106.

EXAMPLE 10

An aqueous mixture was prepared containing the following:

| | |
|---|---|
| alumina hydrogel | 8% (based on $Al_2O_3$) |
| alumina hydrosol | 2% (based on $Al_2O_3$) |
| acrylic acid | 1.75% |
| dihydroxyethylene-bis-acrylamide | 0.0875% |
| ammonium persulphate | 0.32% |
| sodium bisulphite | 0.032% |

This mixture was dispersed as described in Example 1, into a column containing oil. Beads were recovered at the bottom of the column, waterwashed and dried by a slow calcination up to 700° C. They had a crushing strength of 3.4 kg and an apparent density of 0.62 g/ml. Thereafter the beads were impregnated first with meta-tungstic acid and thereafter with nickel nitrate. After each impregnation, a calcination was performed. The catalyst contained 22.5% of tungsten oxide and 7.1% of nickel oxicde. Its relative space activity was 117 when it was used for hydrodesulphurizing gas oil.

EXAMPLE 11

An aqueous mixture was prepared containing the following:

| | |
|---|---|
| alumina hydrogel | 6.0% (based on $Al_2O_3$) |
| alumina hydrosol | 4% (based on $Al_2O_3$) |
| acrylic acid | 2.5% |
| dihydroxyethylene-bis-acrylamide | 0.125% |
| ammonium persulphate | 0.4% |
| sodium bisulphite | 0.04% |

This mixture was dispersed as described in Example 1 into a column containing oil. Beads were recovered at the bottom of the column which contained paraffinic oil heated at 95° C. The beads were waterwashed, dried at 110° C and calcined at 700° C. Their crushing strength was 3.1 kg and their apparent density was 0.7 g/ml. These beads were successively impregnated with solutions of ammonium heptamolybdate, nickel nitrate and cobalt nitrate. Each impregnation was followed by a drying at 110° C and the final impregnation by a calcination at 500° C. The final catalyst contained 17.2% of molybdenum oxide, 0.7% of nickel oxide and 1.4% of cobalt oxide. The relative activity of the catalyst was 125 when it was used for hydrodesulphurizing gas oil.

EXAMPLE 12

The procedure described in Example 1 was repeated, except that the starting aqueous mixture had the following composition:

| | |
|---|---|
| alumina hydrogel | 7.2% (based on $Al_2O_3$) |
| alumina hydrosol | 1.6% (based on $Al_2O_3$) |
| sodium silicate | 1.0% (based on $SiO_2$) |
| acrylic acid | 1.5% |
| dihydroxyethylene-bis-acrylamide | 0.075% |
| ammonium persulphate | 0.25% |
| sodium bisulphite | 0.025% |

The resulting beads which were calcined at 700° C, had an apparent density of 0.48 g/ml. and a crushing strength of 2.1 kg. These beads were impregnated with an ammonium heptamolybdate solution, dried at 120° C, and thereafter impregnated with a cobalt nitrate solution. After calcining the beads, the catalyst consisted of beads containing 13.3% of $MoO_3$, 3.4% of CoO and about 8.3% of SiO$_2$. This catalyst was subjected to an experiment which is comparable to the one described in Example 4 for hydrotreating a residue. The relative activity of this catalyst was 128. With an hourly space velocity of 0.25, 24% of light fractions having a boiling point under 350° C was produced.

What is claimed is:

1. A process for producing catalysts to hydrotreat petroleum fractions, said catalysts containing, after thermal treatment, an oxide or a sulphide of a Group VIII metal and an oxide or a sulphide of a Group VI B metal and a support consisting essentially of alumina, said process comprising preparing said catalyst in the form of beads by agglomeration of alumina by polymerizing in a hot and substantially water-immiscible fluid medium, an aqueous mixture which consists essentially of about 5–30% by weight of alumina hydrogel and alumina hydrosol based on alumina and about 0.25–20% by weight of a water-soluble acrylic monomer which is polymerizable to an uncrossed-linked water-soluble polymer or an uncrossed-linked gel polymer, said acrylic monomer being of the formula

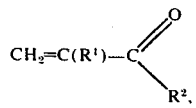

wherein R$^1$ is selected from a group consisting of -H and -CH$_3$ and R$^2$ is selected from the group consisting of -OR$^3$ and -NR$^3$R$^4$, wherein R$^3$ and R$^4$ are selected from the group consisting of -H and a hydrophylic radical;

dispersing said aqueous mixture in the form of droplets into said fluid medium to effect polymerization of the monomer;

recovering the polymerized beads dispersed in said fluid medium; and subjecting said beads to drying and calcining thermal treatment; wherein said oxide or sulphide is introduced into said beads prior to said thermal treatment.

2. The process of claim 1 wherein said aqueous mixture contains about 5 to 30% by weight of alumina hydrogel and hydrosol based on alumina, about 0.25 to 20% by weight of said water-soluble acrylic monomer, and about 0.05 to 2% by weight of a polymerization catalyst for said monomer.

3. The process of claim 1 wherein the ratio of alumina hydrogel to alumina hydrosol in said aqueous mixture is between about 99 : 1 and 50 : 50.

4. The process of claim 3 wherein said ratio is between 85 : 15 and 55 : 45.

5. The process of claim 1 wherein said aqueous mixture contains a monomer in an amount corresponding to about 5 to 150% of the alumina hydrogel and hydrosol by weight.

6. The process of claim 1 wherein said monomer consists of a major part of a monomer whose uncrossed-linked polymer is water-soluble and of a minor part of a monomer whose uncrossed-linked polymer is water-insoluble.

7. The process of claim 1 wherein said alumina hydrogel and hydrosol contain a minor amount of silica or alkali silicate.

8. The process of claim 1 wherein said aqueous mixture contains a cross-linking agent which can react with said monomer.

9. The process of claim 1 wherein said polymerization of said aqueous mixture is carried out by dispersing said aqueous mixture as droplets, and passing these droplets in counter-current flow to a dry hot gas.

10. The process of claim 1 wherein said polymerization of said aqueous mixture is carried out by dispersing said aqueous mixture as droplets at the bottom of a column containing a liquid having a density higher than that of said beads, and recovering said beads from the surface of said liquid.

11. The process of claim 1 wherein said polymerization of said aqueous mixture is carried out by dispersing said aqueous mixture as droplets, at the head of a column containing a liquid having a density lower than that of said beads, and recovering said beads at the bottom of the column.

* * * * *